Jan. 27, 1959 W. E. BRADLEY 2,871,453
SIGNAL SHAPING SYSTEM
Filed Oct. 27, 1953
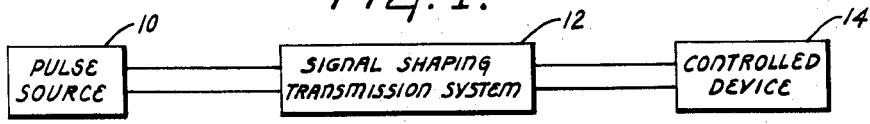
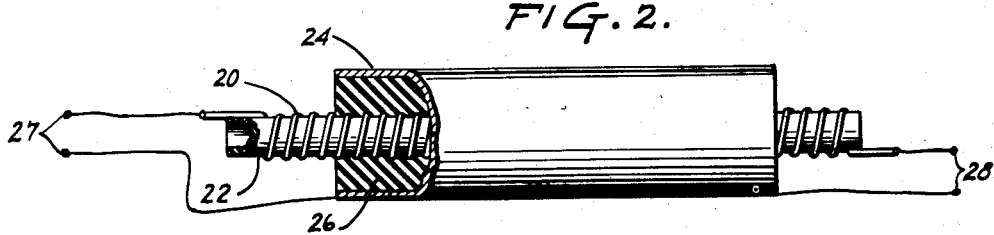
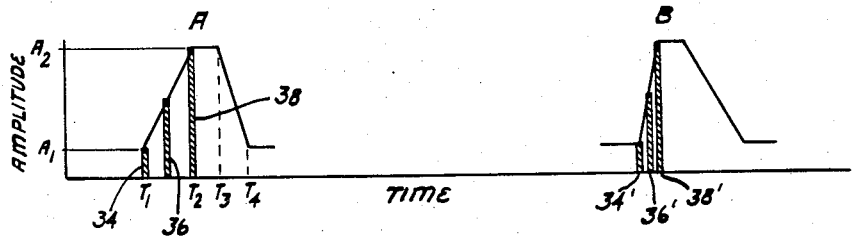
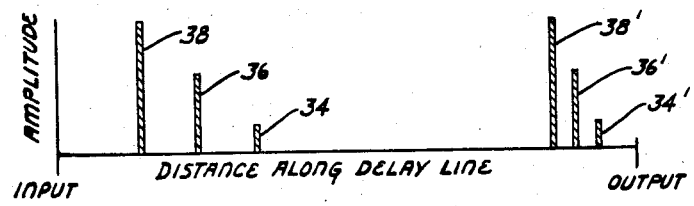
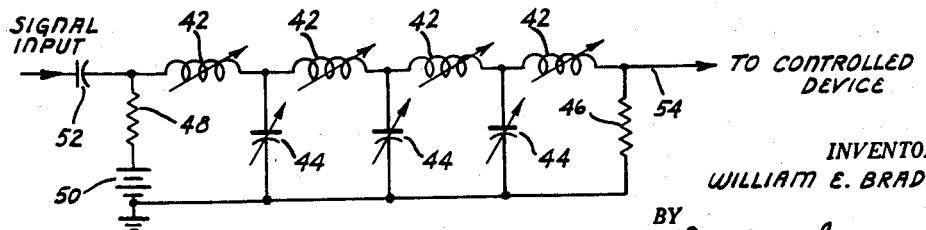
INVENTOR.
WILLIAM E. BRADLEY
BY
AGENTS United States Patent Office 2,871,453
Patented Jan. 27, 1959

2,871,453

SIGNAL SHAPING SYSTEM

William E. Bradley, New Hope, Pa., assignor to Philco Corporation, Philadelphia, Pa., a corporation of Pennsylvania Application October 27, 1953, Serial No. 388,635

5 Claims. (Cl. 333—20)

The present invention relates to waveshaping systems and more particularly, to means for increasing the steepness of pulse wavefronts.

In computors and communication equipment voltage pulses are employed to convey accurate time information. It is known that the accuracy of the time information conveyed by a pulse in the presence of random disturbances is a function of the steepness of the pulse wavefront. Vacuum tube circuits are known which will generate and shape pulses having a spectrum of the order of ten megacycles. The waveform shaping operations performed by such circuits generally include the steps of amplifying the pulses to be shaped and clipping the top and/or bottom of the amplified pulses. Circuits of this type suffer from the disadvantage that timing errors are introduced by reason of the fact that the intermediate portion of the pulse is employed as the timing reference. The time of occurrence of this intermediate portion will vary as the clipping level changes. The vacuum tube circuits mentioned above have the further disadvantage that practical considerations, such as cost, complexity and reliability, limit these circuits to a pulse spectrum of the order of ten megacycles. Since the steepness of the pulse wavefront is a function of the frequency spectrum of the pulse, this places a definite limitation on the steepness that can be obtained using vacuum tube circuits.

Therefore it is an object of the present invention to provide a simple, reliable means for increasing the steepness of pulse wavefronts.

It is a further object of the present invention to provide a novel means for shaping the wavefronts of pulses having a spectrum width of forty megacycles or more.

Still another object of the present invention is to provide a pulse shaping means which does not rely on the use of vacuum tubes for its operation.

I have discovered a novel type of electrical wave transmission system which will accomplish the above-stated objects without resort to the usual amplifying and clipping steps. This novel electrical wave transmission system differs from the transmission system of the prior art in that the velocity of propagation at any region in the transmission system is a function of the instantaneous amplitude of the signal at said region. The electrical length of the transmission system is preferably selected to be such that the difference, between the time required for high amplitude components to traverse the transmission system and the time required for the low amplitude components to traverse the transmission system, is equal to the time of rise of the waveform to be shaped.

For a better understanding of the invention together with other objects, features and advantages thereof, reference should be made to the following detailed description which is to be read in conjunction with the accompanying drawing in which:

Fig. 1 is a block diagram of a waveform shaping system embodying the present invention;

Fig. 2 is a detailed drawing partially broken away of one preferred form of the present invention;

Figs. 3 and 4 are waveforms which explain the operation of the embodiment of Fig. 2; and Fig. 5 is a detailed view of a second preferred embodiment of the present invention.

It will be helpful in understanding the present invention if the following facts are kept well in mind. The term "pulse wavefront," as used in this specification, refers to any portion of a signal that changes rapidly from one value to another. Since timing circuits are generally synchronized by the leading edge of relatively short duration voltage pulses, this type of pulse wavefront has been selected to illustrate the preferred embodiments of the present invention. However, the present invention may be employed to increase the steepness of the leading or trailing edges of short duration voltage pulses, rectangular or triangular waves or any other rapid change in the voltage level of a signal. In the past, it has been convenient to analyze the rate of rise of the leading edge of a voltage pulse in terms of the amplitude and phase of the frequency components into which the pulse may be separated. However, it is believed that the present invention will be more readily understood if the signal to be operated on by the present invention is broken down into incremental time components rather than into individual frequency components. In this form of analysis, a pulse wavefront having a finite time of rise is considered to consist of a low amplitude component (the amplitude being measured from any arbitrary reference level) followed by time components having progressively higher amplitudes. If the time duration of each time component is taken to be sufficiently short, the waveform under consideration may be approximately to any desired degree of accuracy. In describing the invention each incremental signal will be considered as being propagated through the electrical wave transmission system at a velocity determined solely by the amplitude thereof without regard to amplitude of the preceding or following time component. Therefore, in considering the operation of the present invention, attention should be focused on the behavior of these individual time components rather than the behavior of the pulse as a whole. It can be shown that this method of analysis gives results which are in agreement with the actual effect of the system on the pulse as a whole.

In Fig. 1, a pulse source 10 represents a source of signals which are characterized by having a leading edge which rises at a relatively rapid rate but which must be made to rise still more abruptly in order to provide the desired timing precision. Pulse source 10 may be a primary source of pulses such as a unistable multivibrator or a blocking oscillator or it may be a circuit such as a radio receiver which receives a timing pulse from a remote pulse generator. Pulse sharpening wave transmission system 12 is a transmission system having the novel characteristic mentioned above of propagating a signal at a velocity dependent on the amplitude of the signal. This characteristic is employed to increase the steepness of the leading or trailing edges of the pulse supplied to controlled device 14. Controlled device 14 may be any electron circuit, the operation of which is controlled by the time of arrival of the leading or trailing edge of an input pulse signal.

Fig. 2 illustrates one preferred form of electrical wave transmission system having the novel characteristic mentioned above. The electrical wave transmission system shown in Fig. 2 comprises a helically wound central conductor 20 supported on a dielectric member 22. Dielectric member 22 is shown as a hollow tube in Fig. 2 but a solid rod support may be employed instead. Surrounding the spirally wound inner conductor 20 is a cylindrical outer conductor 24. The space between inner conductor 20 and outer conductor 24 is filled with the dielectric medium 26. Terminals 27 are provided for supplying a signal to be shaped to the pulse shaping transmission system and terminals 28 are provided as a means for deriving a signal from the electrical wave transmission system. Electrical wave transmission systems having the physical characteristics mentioned above are well known in the art as delay lines and are described in considerable detail in such reference books as volume 17, Radiation Laboratory Series, McGraw-Hill Book Company, Inc., 1949. However, the embodiment of the present invention shown in Fig. 2 departs from these delay lines by employing a dielectric material 26 which has a dielectric constant which varies with the instantaneous potential appearing between the inner conductor 20 and outer conductor 24 at any point along the delay line. Materials of this type are known in the art as non-linear dielectric or ferroelectric materials. Barium titanate ceramic, which has a dielectric constant which decreases with increasing electric field, is a suitable material for use in constructing the signal shaping electrical wave transmission system of the present invention. The method of shaping pulses disclosed herein, which also forms a part of the present invention, further departs from the prior art in that signals are supplied to the input of the transmission system at a sufficient amplitude to materially effect the propagation constant of the transmission system. In other words, signals are supplied to the input with sufficient amplitude to produce a substantial change in the dielectric constant of the barium titanate between the lower amplitude portion of the signal and the higher amplitude portion of the signal. The operation of the delay line of Fig. 2 will be best understood by reference to the waveforms of Figs. 3 and 4.

Fig. 3A is an amplitude versus time plot of a trapezoidal voltage pulse such as might be applied to the input of the signal shaping transmission system of Fig. 2.

Fig. 3B shows the shape of this pulse as it would appear at the output of the transmission system of Fig. 2.

Fig. 4 is a plot showing the voltage appearing at a selected instant of time at various points along the signal shaping transmission system.

The pulse shown in Fig. 3 has an amplitude $A_1$ up until $T_1$. In the interval between time $T_1$ and time $T_2$ the amplitude of the signal increases to a value $A_2$. The signal remains at amplitude $A_2$ for the interval $T_2$ to $T_3$ and then decreases to amplitude $A_1$ during the time interval $T_3$ and $T_4$. This forms the trapezoidal voltage pulse shown in Fig. 3. The shaded portions 34, 36 and 38 in Fig. 3A represent three of the many incremental time portions that go to make up the leading edge of the pulse wavefront. If the signal shown in Fig. 3A is supplied to the signal shaping transmission system shown in Fig. 2, portion 34 will enter the transmission system first since it occurs the earliest in time. This portion will travel down the transmission system at a constant velocity determined by its amplitude and the characteristics of the dielectric employed in the transmission system. A short time interval later portion 36 will be supplied to the input of the transmission system. This portion will also travel down the transmission system at a constant velocity but the velocity will be different from the velocity of portion 34. This difference in velocity is explained by the fact that the velocity of propagation of a signal through the signal shaping transmission system is inversely proportional to the square root of the product of the effective series inductance per unit length and the effective shunt capacitance per unit length. At a later point in the specification it will be shown that either the capacitance or the inductance or both may be varied in accordance with signal amplitude to provide the desired pulse shaping characteristic. However, for the moment it will be assumed that the inductance per unit length remains constant with changes in signal amplitude and that the changes in the product, LC, is achieved solely by changing the effective shunt capacitance as a function of signal amplitude. Under these conditions the velocity of propagation will be a function of the capacitance between the inner and outer conductors. The higher amplitude of portion 36 decreases the effective dielectric constant of the barium titanate dielectric and the effective capacitance between the two conductors. This in turn causes the portion 36 to travel at a greater velocity than portion 34. Similarly, after a short interval, portion 38 will be supplied to the input of the transmission system and will travel therethrough at the highest velocity of the three portions under consideration. As shown in Fig. 4, portions 34, 36 and 38 are spaced apart along the transmission system. Therefore, local variations in the dielectric constant may occur in response to the variations in amplitude of these portions. As the signal travels down the transmission system, portions 36 and 38 tend to overtake the slower moving portion 34. If the length of the transmission system is properly chosen, the three portions will be closely spaced at the output of the transmission system as shown at 34', 36' and 38' in Fig. 4. The corresponding time versus amplitude plot is shown in Fig. 3B. Since these portions occur much closer together in time than they do in the input pulse, the leading edge of the output pulse, which is the envelope of an infinite number of such portions, has a much steeper rise than the pulse supplied to the input of the transmission system. Figs. 3A and 3B have been plotted on the same time scale in order to show that the time interval between portion 38 at the input of the signal shaping transmission system and portion 38' at the output is less than the time interval between portions 36 and 36' and 34 and 34'. The length of the transmission system may be chosen to provide any desired increase in the slope of the pulse wavefront. Since the passband of an electrical wave transmission system of the type described is very broad, pulses having extremely steep wavefronts may be obtained.

If the time of propagation of a signal through the signal shaping transmission system is made longer than is necessary to produce a substantially vertical wavefront, the wavefront will remain vertical but the pulse as a whole will broaden out and decrease in amplitude. This suggests that there is an optimum design of transmission system to use with each pulse shape and amplitude, but that no serious deterioration of the desired signal will result if the time of transmission of a signal through the transmission system is made slightly longer than the optimum value.

It can be shown that at least up until the time that the leading edge of a pulse becomes vertical, the time width of a pulse passing through my novel signal shaping electrical wave energy transmission system measured at any amplitude level remains substantially constant. Therefore the trailing edge of the pulse is made to have a more gradual slope as the slope of the leading edge is increased.

In some instances it may be desirable to increase the steepness of the trailing edge of a pulse. The trailing edge of a pulse may be cause to have an abrupt slope by first biasing the transmission system with a steady potential and then applying the pulses to be operated upon as negative pulses which partially overcome this bias. This arrangement causes the high amplitude components to appear as low amplitude components and the low amplitude components to appear as high amplitude components. Another alternative is to employ a dielectric material in which the dielectric constant increases with electric stress so that the higher amplitude components travel slower than the low amplitude components.

The signal shaping electrical wave transmission system may take forms other than that described above. Where only very short time differentials are necessary, the transmission system may be a simple coaxial line having a straight rather than a helical inner conductor. Another modification falling within the scope of the invention comprises forming the transmission system with a nonlinear magnetic material either as the support 22 for the helical center conductor or as the dielectric material 26 between the inner and outer conductors. Ferrite is a suitable material for such an embodiment of the invention. It is both a nonlinear magnetic material and a satisfactory dielectric material. Since the velocity of propagation of a signal through a wave transmission system is inversely proportional to the square root of the inductance per unit length of the transmission system, variations in signal amplitude in a transmission system containing a non-linear magnetic material will result in corresponding changes in the velocity of propagation of the incremental signals through it. The ferrite may be biased by applying a D.-C. potential in such a manner that it is caused to operate on a curved portion of its characteristic. This bias may be supplied by passing a direct current through the helically wound inner conductor. In a transmission system of this type, pulses of one polarity will become steeper on the leading edge while pulses of the opposite polarity will become steeper on the trailing edge.

In the examples given above, it has been assumed that the wavefront to be sharpened has a linear rise or fall. If this is the case, it is generally desirable to select the nonlinear magnetic material and/or the nonlinear dielectric material so that the velocity of propagation varies as a linear function of the amplitude of the pulse. This will preserve the linear character of the wavefront. If the rise or fall of the pulse wavefront is other than linear, it may be desirable to make the velocity of propagation some function of the pulse amplitude which is not necessarily linear. In the transmission system of the type shown in Fig. 2, a wide choice of functions is available by proper selection of the dielectric material separating the inner and outer conductors and the material for supporting the helically wound inner conductor. The relationship between the signal amplitude and the velocity of propagation can also be controlled to a certain extent by controlling the bias on the nonlinear magnetic or dielectric material. This bias may also be employed to make small adjustments in the total delay of the transmission system.

The transmission system 12 of Fig. 1 may comprise a waveguide filled or partially filled with a nonlinear dielectric material. It is believed that this embodiment is amply illustrated by the block diagram of Fig. 1. In order to propagate the signal through such a transmission system, it may be necessary to modulate a carrier frequency with the pulse or other signal to be delayed. The signal to be shaped is then the envelope of the carrier frequency. Several nonlinear dielectric materials are known which exhibit a "time constant" in the change of the dielectric constant with changes in signal amplitude. Thus it is possible to select a dielectric material that will not respond to the variations in signal amplitude at carrier frequency but which will respond with a change in dielectric constant to changes in amplitude of the envelope of the carrier frequency.

Fig. 5 illustrates still another embodiment of the present invention which comprises a transmission system made up of a plurality of series inductors 42 and shunt capacitors 44. Inductors 42 and/or capacitors 44 are so arranged that the inductance and/or capacitance per unit of the transmission system is a function of the amplitude of the applied signal. Inductors 42 may be made to exhibit the desired characteristics by winding these inductors on ferrite cores. Variable capacitors 44 may comprise, for example, point contact barium titanate capacitors. A capacitor of this type has one electrode that is relatively small in cross section. Therefore the dielectric in the region adjacent this electrode will saturate at a relatively low signal level. The saturated region will advance outwardly from the smaller electrode as the signal level is increased. This progressive saturation of the dielectric causes the capacitor to have a capacitance which is a function of signal amplitude. A capacitor having a somewhat similar characteristic can be formed by biasing a germanium diode in the direction of more difficult conduction. Changes in the value of back bias which result from the application of a pulse signal to the transmission system will result in a net change in capacitance.

The transmission system of Fig. 5 is terminated in its characteristic impedance by a resistor 46. A resistor 48 and a battery 50 schematically illustrate one means of supplying a bias potential or current to capacitors 44 or inductors 42. Resistor 46 completes the return path for D.-C. biasing current flowing through inductors 42. The signals to be shaped are supplied to the transmission system by way of capacitor 52 and the shaped signals are supplied to the controlled device by way of lead 54.

As the foregoing description indicates, the invention comprises a novel wave propagating path comprising a plurality of successive portions in which the velocity of propagation varies in some degree with signal amplitude. These portions may be short sections of coaxial line, with a straight or helical inner conductor, a section of waveguide, or one section of a lumped parameter transmission line. More specifically, the invention comprises a wave propagating path in which the velocity of propagation of any section is made to be a function of the instantaneous signal amplitude at that section by placing within the electromagnetic field of the section a material which has a characteristic which is affected by changes in amplitude of a component of this electromagnetic field. This characteristic may be the dielectric constant of a material such as barium titanate which is affected by variations in amplitude of the electric material or it may be the permeability of a material such as a ferrite.

The system has been described as a signal shaper or pulse sharpener. However, it is well known that the harmonic content of a signal increases as the waveshape departs from a purely sinusoidal function. Therefore, the system of Fig. 1 may be operated as a harmonic generator by supplying a sinusoidal signal to the input of the signal shaping transmission system and then extracting a harmonic of this input signal from the non-sinusoidal signal appearing at the output of the transmission system. This selection can be made by means of a suitable band pass filter.

It will be obvious to those skilled in the art that many modifications and changes may be made in the specific embodiments chosen to illustrate the invention without departing from the broad teachings of the specification. Therefore reference should be made to the hereinafter appended claims for a definition of the scope of the invention.

What is claimed is:

1. Means for increasing the steepness of a pulse wavefront comprising, an electrical transmission system of finite electrical length in which the velocity of signal propagation at any point along the transmission system is a function of the instantaneous signal amplitude at said point, means for supplying the signal to be shaped to said transmission system at an amplitude such that the time required for the lowest amplitude component to traverse said transmission system differs from the time required for the highest amplitude component to traverse said transmission system by substantially the time of rise or fall of said pulse wavefront, and means associated with the output of said transmission system for receiving signals which have passed therethrough.

2. The system of claim 1 wherein said transmission system comprises a coaxial line having an inner and an outer conductor and a dielectric material separating the inner and the outer conductor, the characteristics of said dielectric material being such that the dielectric constant of any portion thereof is a predetermined continuous function of the instantaneous electrical stress applied to said portion.

3. The system of claim 1 wherein said transmission system comprises an outer conductor and a helically wound inner conductor, and means disposed in association with said inner conductor for varying said velocity of signal propagation.

4. The transmission system of claim 3 wherein said last-mentioned means comprises a core formed of a material having a magnetic permeability that is a continuous smooth function of the instantaneous magnetizing force applied thereto, said core causing the inductance of any portion of said inner conductor to be a function of the instantaneous amplitude of the signal at that portion.

5. The system of claim 1 wherein said transmission system comprises lumped series inductance and lumped shunt capacitance.

References Cited in the file of this patent

UNITED STATES PATENTS

| | | |
|---|---|---|
| 2,387,783 | Tawney | Oct. 30, 1945 |
| 2,565,231 | Hepp | Aug. 21, 1951 |
| 2,607,031 | Denis et al. | Aug. 12, 1952 |
| 2,650,350 | Heath | Aug. 25, 1953 |

FOREIGN PATENTS

| | | |
|---|---|---|
| 666,574 | Great Britain | Feb. 13, 1952 |